F. W. COX.
AIR BRAKE ATTACHMENT.
APPLICATION FILED FEB. 21, 1917.
1,281,297.
Patented Oct. 15, 1918.
2 SHEETS—SHEET 2.
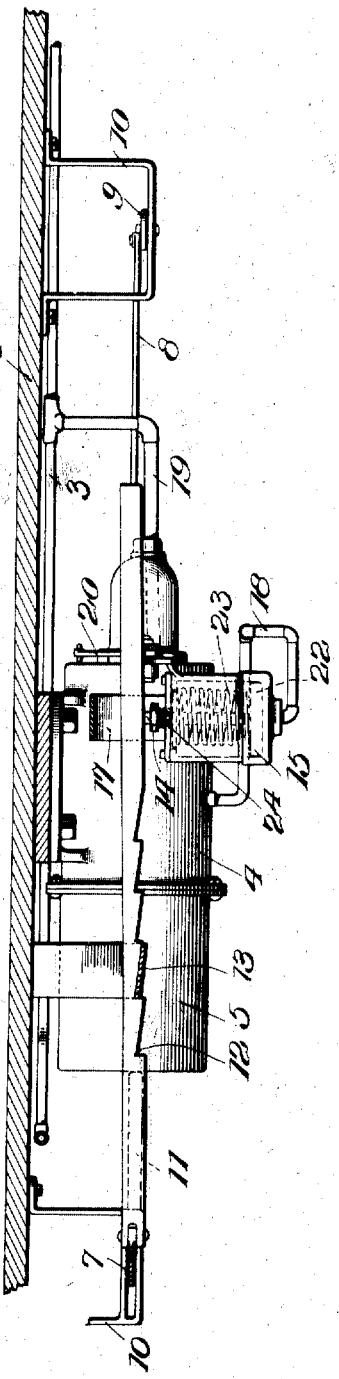
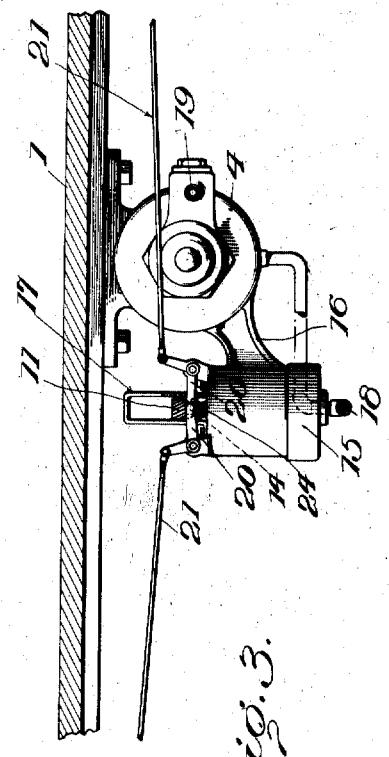
Inventor
Frank W. Cox
By

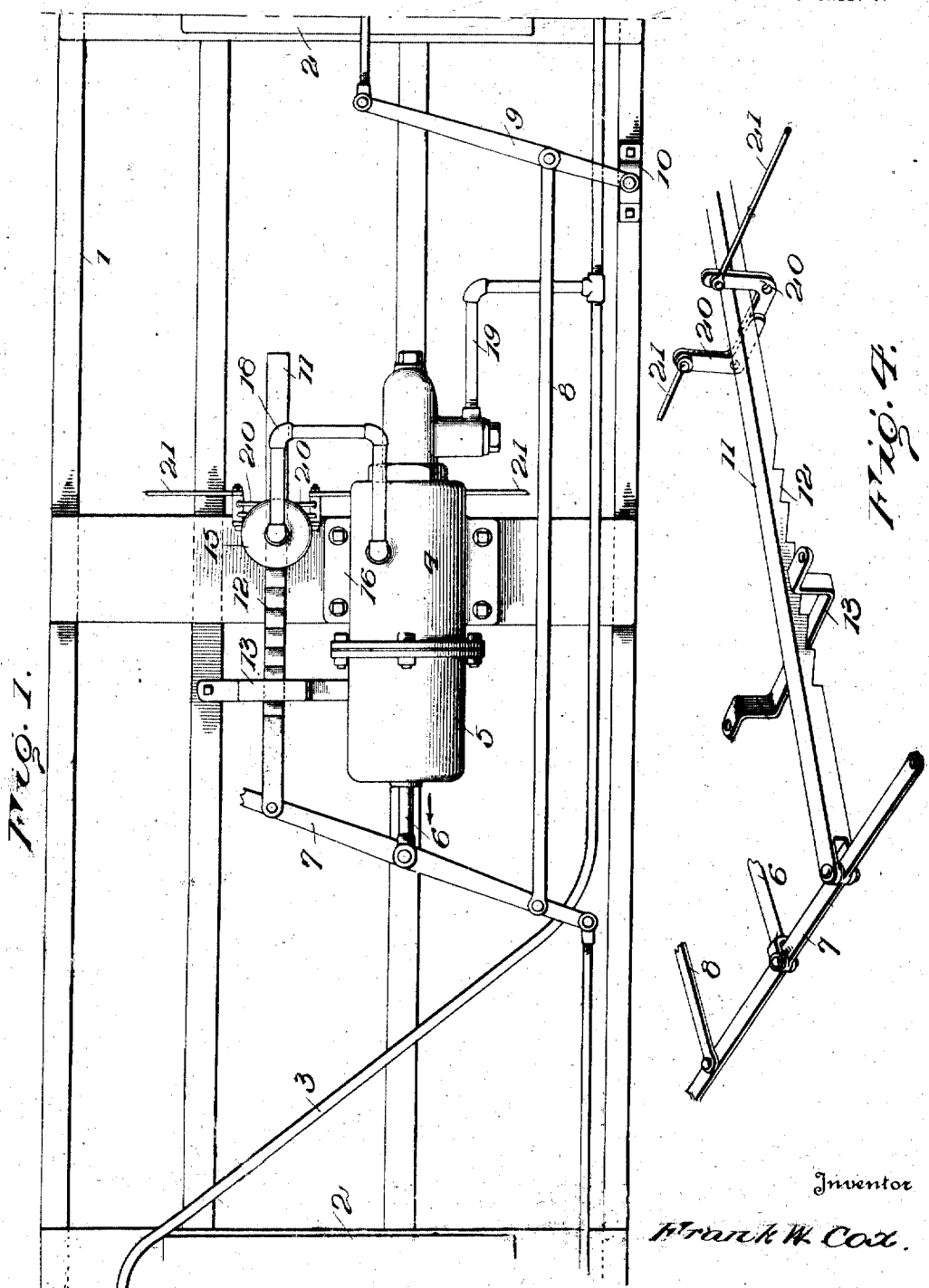

UNITED STATES PATENT OFFICE.

FRANK W. COX, OF BULLSGAP, TENNESSEE, ASSIGNOR OF ONE-HALF TO ROBERT W. MOORE, OF ASHEVILLE, NORTH CAROLINA.

AIR-BRAKE ATTACHMENT.

1,281,297.     Specification of Letters Patent.     Patented Oct. 15, 1918.

Application filed February 21, 1917. Serial No. 150,186.

*To all whom it may concern:*

Be it known that I, FRANK W. Cox, a citizen of the United States, residing at Bullsgap, in the county of Hawkins and State of Tennessee, have invented certain new and useful Improvements in Air-Brake Attachments, of which the following is a specification.

This invention relates to air brakes and has for its object the provision of a simple, inexpensive and efficient locking device by the use of which accidental or premature release of the brakes, due to leakage of air after the brakes have been set, will be avoided. The invention also contemplates means whereby the locking device may be mechanically or pneumatically released.

The invention is illustrated in the accompanying drawings and consists in certain novel features which will be hereinafter first fully described and then more particularly pointed out in the appended claims.

In the drawings:

Figure 1 is a bottom plan view of a portion of a railroad car having my attachment for air brakes applied thereto;

Fig. 2 is a view of the attachment, partly in side elevation and partly in longitudinal vertical section;

Fig. 3 is an end elevation;

Fig. 4 is a detail perspective view.

The car 1 may be of any ordinary dimensions or preferred construction, and a train pipe 3 is supported upon the bottom of the car in the manner now generally practised. An auxiliary reservoir 4 and a brake cylinder 5 are supported upon the bottom of the car and connected with the train pipe 3 in the usual manner. The piston rod 6, extending from the brake cylinder, is connected to a floating lever 7 which is connected by a link 8 with a second lever 9 and said levers are connected with the brake beams and the brake shoes in the usual manner. Pivoted to the lever 7 is a locking bar 11 which is provided on its under side with ratchet teeth 12 adapted to engage a stop 13 which may be of any desired type and is illustrated as consisting of a U-shaped bracket having its ends rigidly secured to the bottom of the car and so disposed that the bracket forms a guide and support for the locking bar. The locking bar extends from the lever 7 longitudinally of the car substantially parallel with the auxiliary reservoir which is between the locking bar and the link 8 in the illustrated arrangement. The ratchet teeth 12 are provided in sufficient numbers to cover the maximum range of movement of the locking bar and between the series of ratchet teeth and its free end the under surface of the lever is smooth so that it may rest upon and ride freely on the upper end of a piston rod 14 rising from a piston 22 within the releasing cylinder 15. The said cylinder 15 is supported by a bracket 16 secured to and depending from the bottom of the car and on the upper end of the said cylinder is a loop or guide 17 in which the locking bar plays. Pressure is admitted to the cylinder 15 below the piston 22 through a branch pipe 18 connected with the auxiliary reservoir. It will be readily understood that when air is admitted to the auxiliary reservoir and pressure established therein, the piston rod 14 will be elevated so that the locking bar will be lifted from engagement with the stop or keeper bar 13 and in this position the locking bar may slide freely. Upon reduction of pressure in the auxiliary reservoir, in the ordinary application of the brakes, the pressure in the releasing cylinder 15 will be simultaneously and correspondingly reduced so that the piston rod 14 will descend and the locking bar will be lowered so that it may ride freely over the stop 13 in one direction but attempted movement in the opposite direction will be prevented by engagement of one of the ratchet teeth 12 with said stop. In order that the locking bar may be released mechanically, as is sometimes desirable or necessary, I provide a pair of angle levers 20 which are pivoted upon the support for the cylinder 15 and are so disposed that their lower arms extend in opposite directions under the locking bar while their upper arms are disposed at opposite sides of the locking bar and have attached to their upper ends the inner ends of the operating rods 21 which extend to the sides of the car and are supported in any convenient or preferred manner on the car. A pull upon either rod 21 will, of course, cause the corresponding lever 20 to rock upon its pivot or fulcrum and swing its lower arm against the under side of the locking bar so as to lift said bar from its engagement with the stop 13. The bar may then move freely over the stop to permit release of the brakes.

Within the releasing cylinder 15, a spring 23 is coiled around the piston rod 14 and bears upon the piston with a tendency to hold it to the bottom of the cylinder. An adjusting nut or hand wheel 24 is rotatably threaded in the head of the cylinder around the piston and bears upon the spring so that if said nut or wheel be turned in one direction it will compress the spring and if it be turned in the opposite direction it will permit the spring to expand, the result being that the pressure at which the locking bar will be released may be varied as desired.

From the foregoing description of the invention, taken in connection with the accompanying drawings, it will be seen that I have provided an exceedingly simple, inexpensive and efficient device whereby premature release of the brakes due to leakage of the brake cylinder will be positively prevented and the accidents and damage caused by cars starting to roll when on a down grade will be avoided. It will, of course, be understood that my device does not affect the brake-applying operation. The brakes are applied in the usual manner by admitting air to the brake cylinder and driving the piston rod 6 in the direction indicated by the arrow in Fig. 1, a corresponding movement being imparted to the floating lever 7 so that a pull will be exerted on the locking bar which will move in the same direction as the piston rod and ride over the stop, one of the ratchet teeth on the bar dropping into engagement with the edge of the stop so as to effectually prevent retrograde movement of the locking bar. Should leakage then occur in any of the pneumatically operated parts, the brakes will remain applied to the wheels so that the car will be held stationary.

Should it be desired to permit the car to roll onto a siding or otherwise move through the force of gravity, acting upon a down grade, or for any other reason it be desired to release the brakes, before the car is again coupled into a train, one of the rods 21 is pulled toward the side of the car and the locking bar will thereupon be released from the stop or keeper 13. When another car is coupled to the stationary car, the brakes will be automatically released upon by the admission of air to the auxiliary reservoir and thence through the pipe 18 into the releasing cylinder 15, where it will lift the piston 22 after overcoming the tension of the spring 23.

My device is composed of few parts which are simple in their construction and arrangement and may be readily applied to any type of car.

Having thus described the invention, what is claimed as new is:

1. In a brake system, the combination with a brake-applying member and means for causing said member to apply the brakes, of a stop, a locking bar connected to the brake-applying member and passing over and constructed to engage said stop, a support for the free end of said locking bar over which the bar may move freely, and means for actuating said support to release the locking bar from the stop.

2. In a brake system, the combination of a brake-applying member, a bracket disposed near the said member, a locking bar connected with the member and extending through and constructed to engage said bracket, a guide for the free end of the said locking bar, a support for the free end of the bar over which the bar may move freely, and means for raising said support whereby to release the locking bar from the bracket.

In testimony whereof I affix my signature.

FRANK W. COX. [L. S.]